United States Patent

[11] 3,554,564

| [72] | Inventor | George G. Lassanske<br>Oconomowoc, Wis. |
|---|---|---|
| [21] | Appl. No. | 736,513 |
| [22] | Filed | June 12, 1968 |
| [45] | Patented | Jan. 12, 1971 |
| [73] | Assignee | Outboard Marine Corporation<br>Waukegan, Ill.<br>a corporation of Delaware |

[54] PRESSURE BACKED PISTON RINGS
3 Claims, 4 Drawing Figs.

[52] U.S. Cl..................................................... 277/170,
277/173; 92/172
[51] Int. Cl....................................................... F02f 5/00,
F16j 9/00
[50] Field of Search............................................ 277/170,
171, 173, 168, 172, 176, 190; 92/172, 181, 182

[56] References Cited
UNITED STATES PATENTS

| 1,862,983 | 6/1932 | Roberts........................ | 277/172 |
| 2,566,603 | 9/1951 | Dykes........................... | 277/173 |

FOREIGN PATENTS

| 944,761 | 6/1956 | Germany..................... | 277/170 |

Primary Examiner—Samuel B. Rothberg
Attorney—Wheeler, Wheeler, House & Clemency

ABSTRACT: Disclosed herein is a piston ring and piston groove assembly which includes a wedge shaped piston ring positioned within a groove in a piston with the included angle between the top and bottom surfaces of the piston ring being less than the included angle between the top land and bottom land of the groove.

PATENTED JAN 12 1971
3,554,564
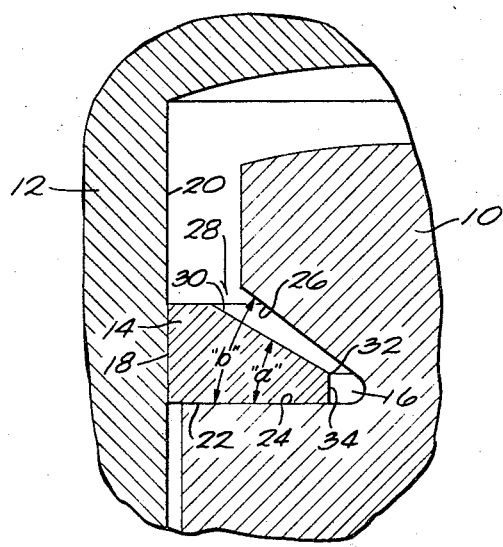
Fig.1
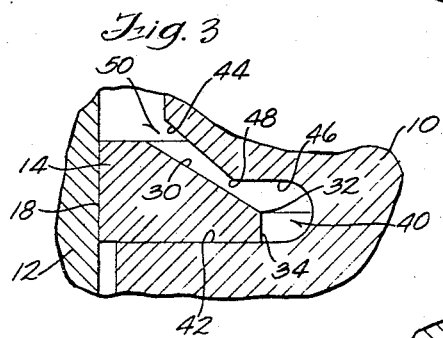
Fig.3
Fig.4
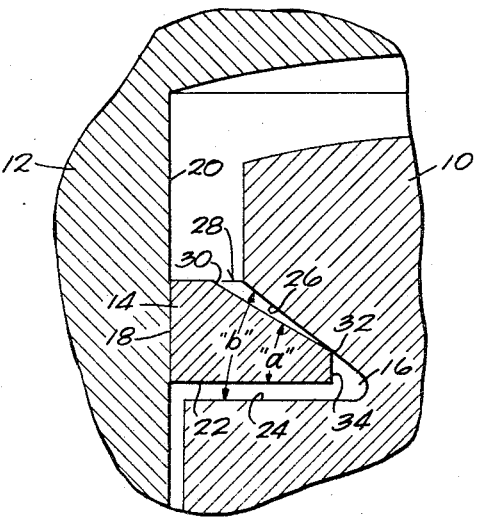
Fig.2
Inventor
George D. Lassanske
By
Wheeler, Wheeler, House & Clemency
Attorneys 3,554,564

PRESSURE BACKED PISTON RINGS

BACKGROUND OF THE INVENTION

This invention relates to internal combustion engines and more particularly to piston ring and groove assemblies for such engines. Such piston ring and piston groove assemblies provide a seal between the piston and cylinder by the engagement of the piston ring with the walls of the cylinder and with the lower or bottom land of the piston groove. During the last part of the compression stroke and during the first part of the firing stroke of the piston, the high-pressure gas in the cylinder will exert a force on the outer surface of the piston ring tending to collapse the ring radially inwardly. If the ring does collapse, the high-pressure gas will leak past the ring, commonly referred to as "blowby."

Such blowby can be prevented by maintaining engagement of the piston ring with the bottom land of the groove so that such high pressure gases will also exert forces on the top and inner surfaces of the ring. These forces, when considered in conjunction with the stiffness of the ring, equal or exceed the force exerted on the outer surface of the ring and thereby hold the ring against the cylinder surface, i.e. preventing radial collapse of the ring into the groove. However, at high operating speeds, the inertial force due to the mass of the ring in conjunction with the friction force, can cause the ring to lift off of the bottom land of the groove and move into engagement with the top land of the groove. Such ring movement hinders effective action of the high-pressure gas on the inner surfaces of the ring and permits an unbalance of radial forces on the ring, effecting collapse of the ring radially inwardly into the groove, resulting in blowby. Previous attempts to minimize blowby include an L-shaped ring and groove assembly, disclosed in the Dykes, U.S. Pat. No. 2,566,603.

SUMMARY OF THE INVENTION

The invention disclosed herein provides a piston ring and piston groove assembly which includes a wedge shaped piston ring positioned within a groove in a piston with the piston ring arranged to engage the top and bottom lands of the groove in such a way that blowby is substantially reduced. More particularly, the piston ring and groove assembly in accordance with the invention includes a piston groove having a bottom land and a top land and a piston ring having a top surface angularly related to the top land and a bottom surface acutely angularly related to the top surface. The included angle between the top and bottom lands of the groove is greater than the included angle between the top and bottom surfaces of the ring. This arrangement of the piston ring in the groove assures that the inclined top surface of the ring is always spaced from the top land of the groove regardless of whether the ring is in engagement with the bottom land or top land of the groove. Consequently, high-pressure gas in the cylinder can exert a force on the inclined top surface of the ring to prevent radial collapse of the ring.

The decrease in blowby as a result of using a wedge shaped piston ring and piston groove assembly disclosed herein provides an increase in power over the entire speed range of engine with a particular increase of power in the upper speed range of the engine. The decrease in blowby particularly in the upper speed range of the engine makes it possible to eliminate the bottom ring and piston groove assembly in two ring and three ring pistons with consequent cost savings. The wedge shaped piston ring can also be manufactured at a lower cost than the L-shaped piston ring and can be used in various shaped piston grooves including the L-shaped groove.

Other objects and advantages will become apparent from the following detailed description when read in conjunction with the accompanying drawings in which:

FIG. 1 is a sectional view of a part of a piston and cylinder with the wedge shaped ring shown in the normal position in a wedge shaped groove in the piston;

FIG. 2 is a sectional view of a part of a piston and cylinder with the wedge shaped ring "lifted" to the top of a wedge shaped groove in the piston;

FIG. 3 is a sectional view of the wedge shaped ring positioned in a different shaped piston groove; and FIG. 4 is a sectional view of the wedge shaped ring positioned in an L-shaped groove.

Referring to the drawing, the piston ring and piston groove assembly in accordance with the invention includes a piston 10 positioned within a cylinder 12 and having a wedge-shaped groove 16 in which there is located a wedge shaped piston ring 14.

More particularly in accordance with the invention, the groove 16 includes a bottom land 24 and a top land 26 located at an acute angle $b$ with respect to the bottom land 24. In addition, the piston ring 14 includes a top surface 30 and a bottom surface 22 located at an acute angle $a$ to the top surface 30. The acute angle $a$ between the top and bottom surfaces of the ring 14 is less than the acute angle $b$ between the top and bottom lands of the groove 16.

During the normal operating speeds of an engine, the piston ring 14 provides a seal between the piston 10 and the cylinder 12 by engagement of at least one of the edges of the outer surface 18 of the ring 14 with the inner surface 20 of the cylinder 12 and by engagement of at least the radially inward edges of the bottom surface 22 of the ring 14 with the bottom land 24 of the groove 16. Although shown at right angles, the outer surface 18 of the ring need not be exactly at right angles to the bottom surface 22. At high operating speeds the piston ring 14 can lift off of the bottom land 24 of the groove 16 and can move axially relative to the piston until the line of intersection 32 between the top surface 30 and inner surface 34 of the ring 14 sealingly engages the top land 26 of the groove 16. The seal between the outer surface 18 of the ring 14 and the surface 20 of the cylinder 12 will be maintained by the force of the high pressure gas present in the space 28 acting on the top surface 30 of the ring 14.

As previously stated, the bottom surface 22 and top surface 30 of the piston ring 14 are angularly related to each other by an acute angle $a$. The bottom land 24 and top land 26 of piston groove 16 are angularly related to each other by an acute angle $b$. The acute angle $b$ between the bottom land 24 and top land 26 of the groove 16 is always greater than the included angle $a$ between the bottom surface 22 and top surface 30 of the piston ring 14.

In operation, whenever the ring 14 moves into contact with the top land 26 of the groove (FIG. 2), the ring will engage the top land 26 at the edge or line of intersection 32 between the top surface 30 and the inner surface 34 of the ring 14 due to this angular relationship between the angles $a$ and $b$. The space 28 formed between the top surface 30 and the top land 26 will remain in communication with the high pressure gas in the cylinder 12. The high-pressure gas in the space 28 will thus exert a force on the top surface 30 of the ring 14 providing a radially outward component of force which when combined with the stiffness of the ring is sufficient to hold or to prevent the ring from collapsing radially inwardly in the groove. As shown in the drawings, the piston ring is arranged in the piston groove so that the bottom land and bottom surface are parallel. However, the ring 14 is generally tipped or tilted in the groove 16 with the bottom surface 22 at an angle to the bottom land 24 and the outer surface 18 at an angle to the inside surface 20. In general, the angle $b$ between the bottom land 24 and the top land 26 of the groove 16 should be greater than the sum of the angles between the bottom land 24 of the groove 16 and the bottom surface 22 of the ring 14 and between the bottom surface 22 and top surface 30 of the ring, whereby there is always provided an acute angular area between the top surface 30 of the ring and the top land 26 of the groove.

The seal between the piston 10 and the cylinder 12 at the two positions of the piston ring 14 in the groove 16 is maintained under the following operating conditions. At low operating speeds the force of the high pressure gas in the cylinder 12 will act on the top surface 30 and inner surface 34 of the ring 14 holding the ring 14 in sealing engagement with the surface 20 of cylinder 12 and the bottom land 24 of the groove 16 (FIG. 1). At high operating speeds, if the ring 14 lifts off of the bottom land 24 of the groove 16 (FIG. 2), the ring will move axially relative to the piston into engagement with the top land 26 of the groove 16. The edge or line of intersection 32 between the top surface 30 and inner surface 34 will engage the top land 26 leaving the space 28 between the top surface 30 of the ring 14 and the top land 26 of the groove 16. The outer surface 18 of the ring 12 will remain in sealing engagement with the surface 20 of the cylinder 12 due to the radial component of force exerted on the ring by the high pressure gas in the space 28 acting on the top surface 30 of the ring 10.

In FIG. 3, the wedge shaped ring 14 is shown positioned in a groove 40 having a bottom land 42 and a top or upper land 44 acutely angularly related to the bottom land 42 and angularly related to the top surface 30 of the ring 14. An intermediate land 46 is provided in the groove in a substantially parallel relation to the bottom land 42 and intersects the top land 44 at an edge or line 48. At low operating speeds, the ring 14 will seal the piston 10 in the cylinder 12 as described above. At high speeds, if the ring 14 will move axially relative to the piston into engagement with the edge 48 leaving a space 50 between a portion of the top surface 30 of the ring and the top land 44 of the groove.

In FIG. 4, the wedge shaped ring 14 is shown positioned in an L-shaped groove 60 having a bottom land 62 and an upper or top land having a portion 64 substantially parallel with the bottom land 62 and a portion 68 approximately perpendicular to the bottom land 62. An intermediate land 66 is provided in the groove and intersects the upper land portion 68 of the piston at a line of intersection or edge 70. At low operating speeds, the ring 14 will seal the piston in the cylinder in the same manner as described above. At high operating speeds, if the ring lifts off of the bottom land 62, the ring 14 will move axially until edge 70 engages top surface 30 leaving a portion of the top surface exposed to the high-pressure gas in the cylinder.

The piston ring and piston groove assembly disclosed herein provides a space between the ring and groove which is in communication with the high-pressure gas in the cylinder to produce a radially outwardly directed force on the ring. This is accomplished by the engagement of an edge on either the ring or the piston which engages a surface on the other of either the ring or piston when the ring moves axially in the groove. This can be seen in the embodiments shown in FIGS. 1 and 2 by the engagement of edge 32 with the intermediate portion of the surface of land 26, in FIG. 3 by the engagement of edge 48 with the intermediate portion of the top surface 30 and in FIG. 4 by the engagement of edge 70 with the intermediate portion of the top surface 30. The radial force produced by the high-pressure gas in the space between the ring and groove is sufficient to maintain the seal between the outer surface 18 of the ring and the inner surface 20 of the piston 12.

Various of the features of the invention are set forth in the following claims.

I claim:

1. An assembly comprising a piston having on its outer periphery a groove having a top land a and a bottom land, said bottom land extending approximately perpendicularly to the axis of said piston and at an acute angle to said top land, and a piston ring located in said groove and having a top surface, an outer generally cylindrical peripheral surface having an axis generally coinciding with the axis of the piston, and a bottom surface extending approximately perpendicularly to said outer peripheral surface and being acutely angularly related to said top surface at an acute angle less than the acute angle between said top and bottom lands of said groove.

2. An assembly according to claim 1 wherein said piston ring includes a top surface portion parallel to said bottom surface and extending radially inwardly from said outer peripheral surface.

3. An assembly comprising a piston with a groove defined by at least two surfaces including an upper land and a bottom land, said bottom land extending generally perpendicularly to the axis of said piston, and a ring positioned in said groove and having a generally cylindrical surface adapted to engage a cylinder wall, a top surface, and a bottom surface, said bottom surface extending generally perpendicularly to said cylindrical surface, one of said groove upper land and said ring top surface having an edge engageable with an intermediate portion of the other of said groove upper land and said ring top surface, said ring bottom surface being spaced relative to said ring top surface such that said ring top surface is axially spaced from said groove upper land when said ring bottom surface is engaged with said groove bottom land, and such that said ring bottom surface is axially spaced from said groove bottom land when said edge is engaged with said intermediate portion, and such that upon movement of said ring axially away from said groove bottom land, there is provided a space extending from said edge in the direction remote from said groove bottom land.